United States Patent
Langendorf et al.

(10) Patent No.: US 6,505,282 B1
(45) Date of Patent: *Jan. 7, 2003

(54) METHOD AND APPARATUS FOR DETERMINING MEMORY TYPES OF A MULTI-TYPE MEMORY SUBSYSTEM WHERE MEMORY OF THE DIFFERENT TYPES ARE ACCESSED USING COLUMN CONTROL SIGNALS WITH DIFFERENT TIMING CHARACTERISTICS

(75) Inventors: Brian K. Langendorf, El Dorado Hills, CA (US); James M. Dodd, Shingle Springs, CA (US); Nicholas D. Wade, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 08/821,705

(22) Filed: Mar. 19, 1997

Related U.S. Application Data (63) Continuation of application No. 08/348,365, filed on Nov. 30, 1994.

(51) Int. Cl.$^7$ ............................................... G06F 12/00
(52) U.S. Cl. .......................... 711/170; 711/5; 711/105; 714/719; 365/189.01
(58) Field of Search ................................ 711/115, 170, 711/171, 172, 105, 5; 365/189.01; 371/21.1, 2, 21.6; 714/718–723

(56) References Cited

U.S. PATENT DOCUMENTS

| | | | |
|---|---|---|---|
| 4,195,770 A | * | 4/1980 | Benton et al. ............. 371/21.2 |
| 4,642,784 A | * | 2/1987 | White, Jr. et al. ...... 364/551.01 |
| 4,926,314 A | * | 5/1990 | Dhuey ................... 395/497.03 |
| 4,965,799 A | * | 10/1990 | Green et al. ................ 714/719 |

(List continued on next page.)

OTHER PUBLICATIONS

Kristina Sullivan, "Simcheck add–on lets users identify faulty DRAM chips", PC Week, v7, n18, p18 (1), May 7, 1990.*
"Old SIMCHECK Product Line", [Online], available :http://www.simcheck.com/sim1pl.htm, not available.*
"Intel readies 'Triton' PCI chipset", Electronic News, v412 n2050, p68(1), Jan. 30, 1995.*
U.S. Patent application for "M&A for Controlling of a Memory Subsystem Installed with Standard Page Mode Memory and an Extended Data Out Memory"; Langendorf, Brian K.; application No. 08/381,091; filed on Dec. 23, 1994.
MICRON Semiconductor, Inc., "Technical Note: Reduced DRAM Cycle Times With Extended Data–Out"; 1993 DRAM Data Book, Rev. 3/93; pp. 6–37 through 6–43.
IBM Technical Disclosure Bulletin: "Programmable Memory Controller"; vol. 31, No. 9; Feb. 1989; pp. 351–354.

*Primary Examiner*—Hong Kim
(74) *Attorney, Agent, or Firm*—Blakely, Sokoloff, Taylor & Zafman LLP (57) ABSTRACT

In a memory subsystem having a plurality of memory banks populated with up to a corresponding plurality of dynamic random access memory (DRAM) modules, the DRAM modules being of an extended data out type DRAM module or a page mode type DRAM module, ascertaining the type of DRAM module installed in populated ones of the plurality of memory banks. The DRAM type is determined by storing a predetermined value to a predetermined location in populated ones of the plurality of memory banks, and subsequently reading data from the predetermined location of populated ones of the plurality of memory banks using a page read control signal suitable for the extended data out type DRAM modules. If the data read corresponds to the predetermined value stored, an extended data out type DRAM module is identified.

18 Claims, 7 Drawing Sheets

U.S. PATENT DOCUMENTS

| | | | |
|---|---|---|---|
| 4,993,027 A | * 2/1991 | McGraw et al. | 395/183.05 |
| 5,175,835 A | * 12/1992 | Beighe et al. | 711/212 |
| 5,179,686 A | * 1/1993 | White | 395/497.03 |
| 5,261,073 A | * 11/1993 | Mann | 395/405 |
| 5,301,278 A | * 4/1994 | Bowater et al. | 395/405 |
| 5,307,320 A | * 4/1994 | Farrer et al. | 365/230.01 |
| 5,331,593 A | * 7/1994 | Merritt et al. | 365/189.11 |
| 5,349,566 A | * 9/1994 | Merritt et al. | 365/233.5 |
| 5,375,084 A | * 12/1994 | Begun et al. | 365/63 |
| 5,394,541 A | * 2/1995 | Chesley et al. | 711/111 |
| 5,457,659 A | * 10/1995 | Schaefer | 365/222 |
| 5,475,815 A | * 12/1995 | Byers et al. | 395/183.08 |
| 5,488,581 A | * 1/1996 | Nagao et al. | 365/189.05 |
| 5,522,064 A | * 5/1996 | Aldereguia et al. | 395/556 |
| 5,532,961 A | * 7/1996 | Mori et al. | 365/189.05 |
| 5,561,814 A | * 10/1996 | Glew et al. | 395/833 |
| 5,568,651 A | * 10/1996 | Medina et al. | 395/894 |
| 5,640,507 A | * 6/1997 | Lipe | 395/183.01 |
| 5,802,550 A | * 9/1998 | Fullam et al. | 711/102 |
| 5,893,136 A | * 4/1999 | Stolt et al. | 711/105 |
| 5,918,242 A | * 6/1999 | Sarma et al. | 711/5 |

* cited by examiner

CAS# STATE MACHINE

FIG. 5
FLOW CHART FOR EDO VS. PAGE MODE DETECTION

FIG. 7 (PRIOR ART)

METHOD AND APPARATUS FOR DETERMINING MEMORY TYPES OF A MULTI-TYPE MEMORY SUBSYSTEM WHERE MEMORY OF THE DIFFERENT TYPES ARE ACCESSED USING COLUMN CONTROL SIGNALS WITH DIFFERENT TIMING CHARACTERISTICS

This is a continuation of application Ser. No. 08/348,365 filed Nov. 30, 1994.

BACKGROUND OF THE INVENTION

1. Field of the Invention

The present invention relates to the field of computer system memory. More specifically, the present invention relates to an apparatus for integrating standard page mode dynamic random access memory (DRAM) devices with extended data-out DRAMs and a method for distinguishing between the type of DRAM populated in a memory subsystem in a computer system.

2. Description of Related Art

Personal computer systems are becoming increasingly more powerful and less expensive. At present, personal computer systems are achieving processing performance levels previously achieved only by mini-computers. And as the demand for high performance computers continues to grow, system designers will develop faster and more powerful microprocessors.

As microprocessors become increasingly faster, the speed of memory devices continue to be a major limiting factor in determining the performance of the computer systems. Specifically the memory speed can limit how fast application programs will run. While fast memory devices such as static random access memory (SRAM) devices are available, their use in main memory in a computer system is not common due to the relatively high cost of these memory devices.

Most system designers use dynamic random access memory (DRAMs) devices in main memory due to their relatively low cost and low power consumption. However, the slower speed of DRAMs tend to impede the performance of high performance microprocessor based computers.

To improve the performance of the DRAM devices, many system designers use page mode DRAMs. In a paged memory device memory is typically accessed by the underlying processor of the computer system by issuing an address that selects a particular location in the memory array. The address is then loaded into a memory controller which handles the task of providing row and column addresses used by the DRAM from the address provided by the processor.

After receiving an address from the processor, the memory controller places the row and then the column address on the DRAM's address bus in response to the timing requirements of the DRAM. In prior art computer systems using standard page mode DRAMs, the microprocessor issues a full address to access a specific memory location via the memory controller. To handle address requests to main memory, prior art memory controllers include latches to temporarily retain previous address requests from the processor which are then compared with incoming addresses to determine if the DRAM's row and column addresses have changed between successive memory requests.

In addition to the memory controller retaining addresses, the DRAMs retain data which require periodic refreshes. Refreshing the DRAM delays data fetches from a page in the DRAM due to the reasserting of control signals to the DRAM to reinitiate memory accesses in progress prior to a refresh cycle. Specifically, the row address strobe signal (RAS#) to the DRAM must be reasserted to reopen the page being accessed prior to the refresh. In reopening the page, the falling edge of the column address strobe (CAS#) is used to strobe a column address in the DRAM. Strobing the column address requires that CAS# be deasserted for a period typically referred to as precharge period. There is a minimum time between precharge and the next data being made available by the DRAM. The DRAM turns off its output signals when the CAS# is high requiring that the CAS# stays low until data is captured by the memory controller thereby delaying the precharge and subsequent availability of the next piece of data from the DRAM. This causes delays that cause wait states in a read cycle and thus slow down the performance of the underlying processor.

To alleviate the delays caused in accessing data due to the CAS# precharge time, system designers use a fast performance DRAM device known as the Extended Data Out DRAM (EDO DRAM) which have the same packaging and power characteristics as the page mode DRAMs and do not tristate the data output when CAS is deasserted, but have different timing requirements than the standard page mode DRAMs and do not cause the delays after a refresh cycle that are characteristic of the standard page mode DRAMS.

Although various types and sizes of the DRAMs (e.g., EDO DRAMs and the standard page mode DRAMs) may be installed in the memory subsystem in the computer, the computer must be configured properly in order to access the different types of DRAMs. In some prior art systems, the computer system is configured by use of hardware switches for specifying a plurality of memory configuration parameters. These parameters include the presence of a memory device in a particular bank, the type of memory device, and the size of the memory device. The use of hardware switches however requires the user to be knowledgeable of the various memory devices installed in the computer system.

Furthermore, despite performance advantage that the EDO DRAMs have over the current standard page mode DRAMs, system designers have not found a way to effectively integrate the EDO DRAMs into existing computer systems. Current implementations use either the standard page mode DRAMs or the EDO DRAMs. So, for example, if a computer user, who does not know much about the differences between memory devices, purchases a system designed to use the EDO DRAMs, the user may not be able to add a standard page mode DRAM purchased from the local computer store into the computer and derive the same performance if the computer had either all standard page mode DRAMs or EDO DRAMs. Mixing the two DRAM types slows performance because if the computer system is designed to take only standard page mode DRAMs, adding EDO DRAMs results in the EDO DRAMs using page mode DRAM timings or not working at all. On the other hand, if the computer user adds standard page mode DRAMs to a system designed for EDO DRAMs, the system will perform slowly because the memory controller is not able to distinguish between the EDO DRAM and the standard page mode DRAM due to the differences in the control and timing requirements of the two types of memory.

Thus, a system that effectively integrates and automatically configures various types of DRAM memory devices installed in the memory subsystem is needed.

SUMMARY OF THE INVENTION

The present invention provides a method and apparatus for integrating and distinguishing between memory banks populated with a standard page mode dynamic random access memory device (DRAM) or an extended data-out (EDO) DRAM in a memory subsystem. The preferred embodiment includes a plurality of configuration registers—each a bit wide—having stored configuration information that identifies the type of DRAM device installed in a memory bank. Particularly, each configuration register corresponds to one or more rows of memory banks of DRAMs installed in the memory subsystem.

The preferred embodiment includes a DRAM bank decoder having decoding logic for decoding bank locations responsive to address requests from the processor in the computer system to the memory subsystem. The preferred embodiment further includes a detection logic circuit for detecting bits specified by the configuration registers corresponding to each memory bank populated with a DRAM device. The detection logic in combination with the decode logic determines whether memory bank locations in the memory subsystem is populated or not.

Memory access control signals comprising a row address strobe (RAS), a column address strobe (CAS), and an address strobe (ADS) are utilized by the preferred embodiment for control and timing requirements of the DRAM devices installed in the memory subsystem. A CAS state machine controls the various states of accesses to the DRAM devices. The CAS state machine in combination with the detection logic determines whether an address received by the memory subsystem is designated to the standard page mode DRAM or the EDO DRAM.

Advantages of the preferred embodiment of the present invention include the effective integration of various types of DRAM memory devices with different control and timing requirements in the same memory subsystem without degrading performance. The preferred embodiment also has the advantage of automatically storing information for identifying the type of memory device installed in a memory bank to spare the system user the inconvenience of determining the memory type and then manually setting hardware switches to configure memory.

The CAS state machine of the preferred embodiment allows memory access requests to either the standard page mode DRAM or the EDO DRAM without inserting an inordinate amount of wait states to slow the system down.

The features and advantages described in the specification are not all inclusive, and particularly, many additional features and advantages will be apparent to one of ordinary skill in the art in view of the drawings, specification and claims hereof. Moreover, it should be noted that the language used in the specification has been principally selected for readability and instructional purpose, and therefore resort to the claims is necessary to determine the inventive subject matter.

DETAILED DESCRIPTION OF THE PREFERRED EMBODIMENT

FIGS. 1 through 7 of the drawings disclose various embodiments of the present invention for purposes of illustration only. One skilled in the art will readily recognize from the following discussion that alternative embodiments of the structures and methods illustrated herein may be employed without departing from the principles of the invention.

Overview of the Computer System

Figure 1:
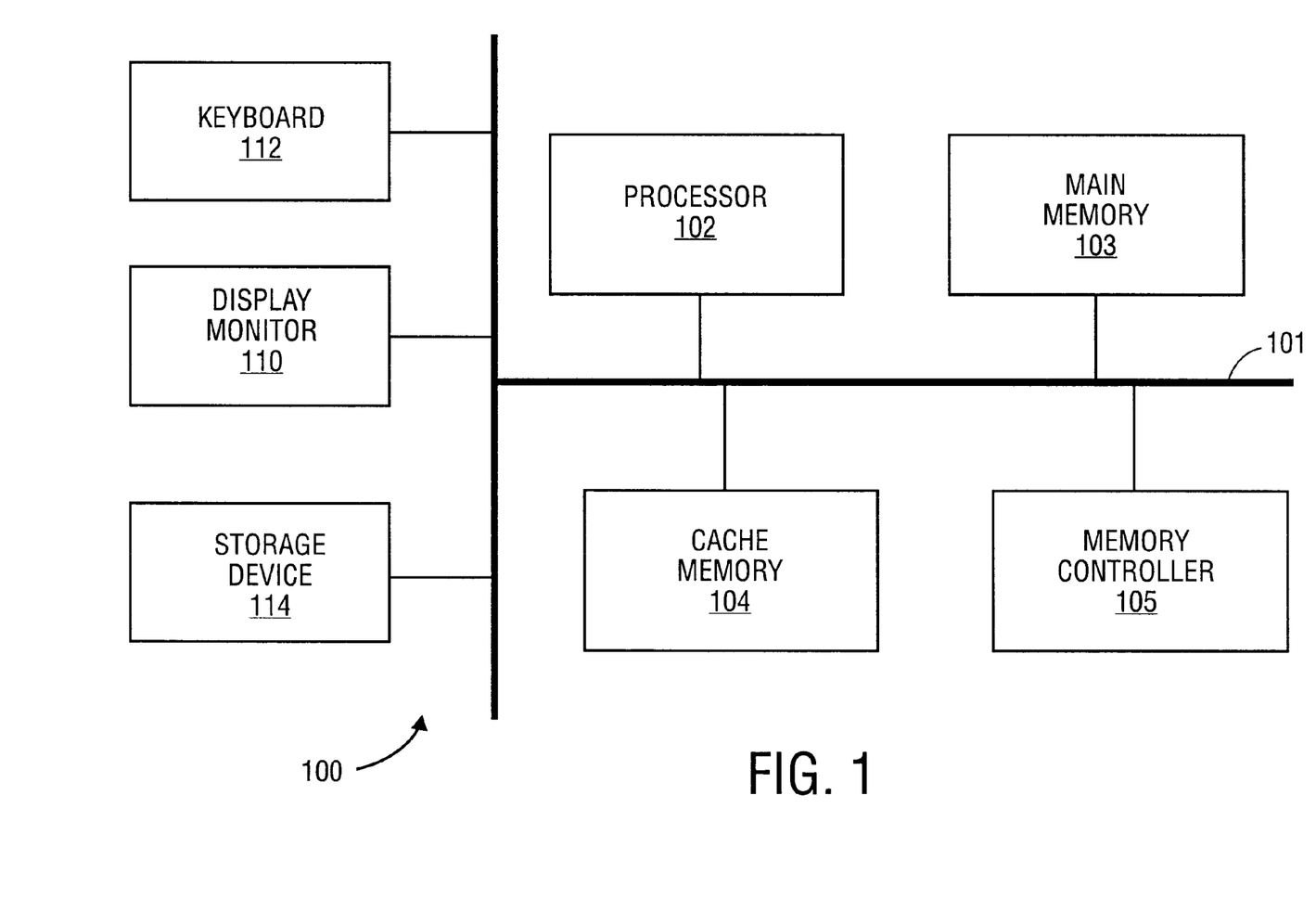
FIG. 1 is a block diagram illustration of a typical architecture of a computer system of the present invention.

Reference is first made to FIG. 1 which is a block diagram illustrating a computer system of the present invention. As illustrated in FIG. 1, a computer system 100 of the present invention generally comprises a bus 101 for communicating information, a processor 102 coupled to the bus 101 for processing instructions, a main memory 103 coupled to the bus 101 for storing data and instructions for the processor 102, and a cache memory 104 also coupled to the bus 101 for temporarily storing data and instructions for the processor 101. A memory controller 105 is also shown coupled to the bus 101 for controlling access to the main memory and a cache memory 104.

The computer system 100 also includes a display device 110 coupled to the bus 101 for displaying information to the computer user, an alphanumeric input device 112 coupled to the bus 101 for communication information and command selections to the processor 102, and a storage device 114 also coupled to the bus 101 for storing data for the computer system 100.

Figure 2:
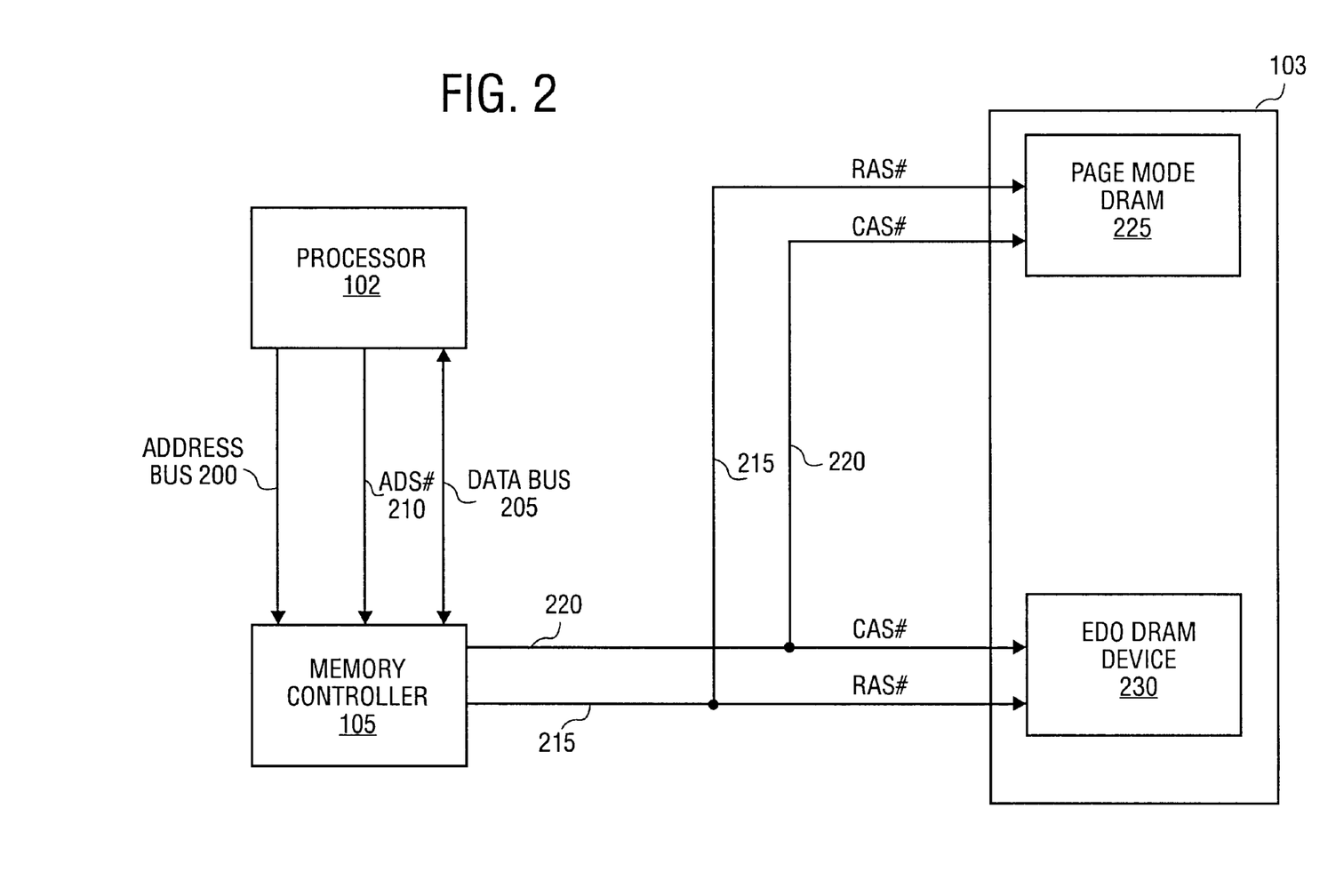
FIG. 2 is a block diagram illustrating a processor, a memory controller, and memory including both a standard page mode dynamic random access memory (DRAM) device and extended data-out DRAMs.

Reference is now made to FIG. 2, which is a block diagram illustrating one embodiment of the preferred embodiment of the present invention. As illustrated in FIG. 2, the processor 102 is coupled to the main memory 103 via the address bus 200 to send address requests to the main memory 103. The processor 102 is also coupled to the memory controller 105 via the Address Strobe (ADS#) signal 210. The processor 102 initiates a read or write cycle to the memory subsystem by asserting the ADS# signal 210 to the memory controller 105.

The memory controller 105 is coupled to the main memory 103, which comprises a standard page mode DRAM device 225 and an Extended Data Out DRAM (EDO) device 230, via the Row Address Strobe (RAS#) signal 215 and the Column Address Strobe (CAS#) signal 220. The ADS# 210, the RAS# 215, and the CAS# 220 signals are labeled with a "#" to indicate that the signals are low when asserted (i.e., active low).

In a normal mode of operation, the processor 102 applies an address and control signals to address bus 200 and asserts the ADS# signal 210 to the memory controller 105. The memory controller 105 receives the address and control signals from the bus 100. Depending on the specified address and control signals, the memory controller 105 signals to the main memory 103 via the CAS# 220 and RAS# 215 signals. On receipt of the memory access control signals from the memory controller 105, data is transferred via the data bus 205 into either the EDO DRAM 230 or standard page mode DRAM 225 for a write operation, or data is transferred from either of the DRAMs to the processor 102 for a read operation.

Figure 3:
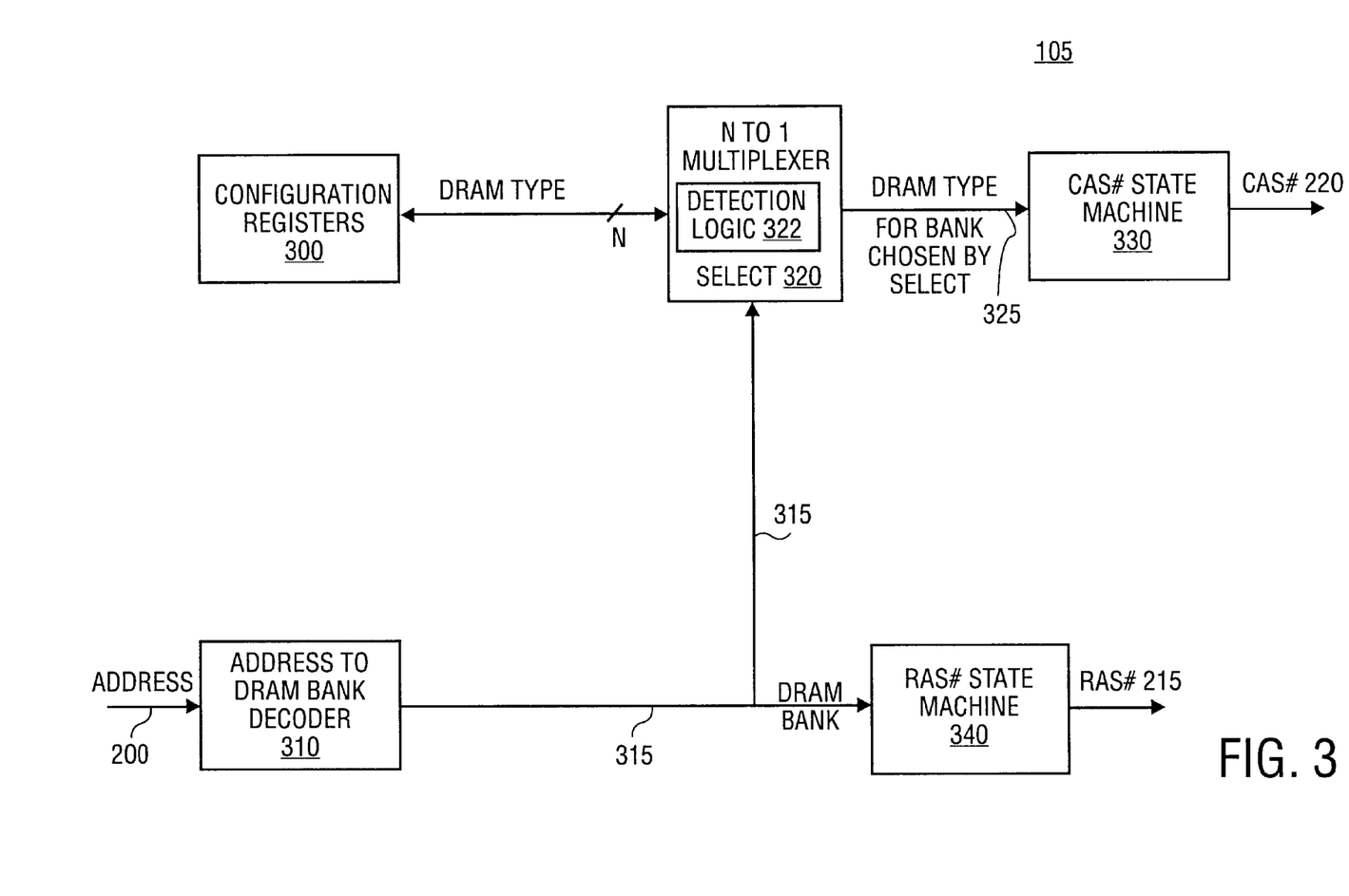
FIG. 3 is a block diagram of the memory controller including the configuration registers, the bank decoder, the Column address strobe (CAS) and Row address strobe (RAS) state machines, and detection logic circuit.

Reference is now made to FIG. 3, which is a block diagram illustrating the internal architecture of one embodiment of the memory controller 105 of the preferred embodiment. Some of the components and the operation of the memory controller 105 is well known in the art and will not be described in detail. However, the memory controller 105 of the preferred embodiment includes a plurality of configuration registers 300 each of the configuration registers for storing information identifying the type of DRAM device stored in a memory bank, a DRAM bank decoder 310 including decoding logic for decoding address requests to the various memory bank locations, and a multiple input select multiplexer 320 including detection logic circuitry for detecting which memory banks are populated with the DRAM devices. The memory controller 105 also includes a column address strobe (CAS) state machine 330 and a row address strobe (RAS) state machine 340. The function of the RAS state machine is well known in the art and will not be described in detail.

With continued reference to FIG. 3, the configuration registers 300 store configuration information related to memory devices installed in the main memory 103. In the preferred embodiment, the number of configuration registers corresponds to the number of memory banks in the main memory 103. Configuration information is loaded into each of the registers during the initialization of the computer system and any subsequent addition of a DRAM device to the computer system after initialization. The memory controller 105 of the preferred embodiment also includes a detection logic to determine memory pull-ups or pull-downs depending on the configuration information presented by the system BIOS.

The address DRAM bank decoder 310 including decoding logic decodes the DRAM bank location in the main memory 103 in response to an address presented by the processor 102. The bank decoder 310 is coupled to a select multiplexer 320 and a RAS# state machine 340 via DRAM bank lines 315. The select multiplexer 320 includes the detection logic which in combination with the decoding logic selects which memory bank a memory access request-specifically a read request-is destined. The select multiplexer 320 is coupled to a CAS# state machine 330 via a select signal 325. The address bank decoder 320 also couples to the ADS# signal 210 from the processor 102.

During a normal system boot operation of computer system 100, the system BIOS (not shown) configures boot registers to configure the various memory banks in the system. The system BIOS then presents this information to the configuration registers 300 to be stored so that the memory controller knows the contents of each bank of memory in the system (i.e., whether a bank contains EDO or standard DRAM). In the memory controller 105 of the preferred embodiment, each of the configuration registers 300 is a bit wide and is set by the memory controller 105 when a corresponding memory bank containing the DRAM devices is being accessed. During a read operation to the main memory 103, the memory controller 105 presents the configuration information to the select multiplexer 320 so that access requests to a specific memory bank is decoded and the appropriate DRAM device is selected. After selecting the appropriate DRAM device based on the decode and the configuration information, the select multiplexer 320 signals the CAS# state machine 330 which then controls the timing requirements of the particular DRAM device being accessed. The operation of the CAS# state machine is described in detail in FIG. 4. Although the configuration registers 300 and the CAS# state machine 330 as described are embodied in the memory controller of the preferred embodiment, the configuration registers 300 and the CAS state machine 330 may be embodied in other components of the computer system 100.

Figure 4:
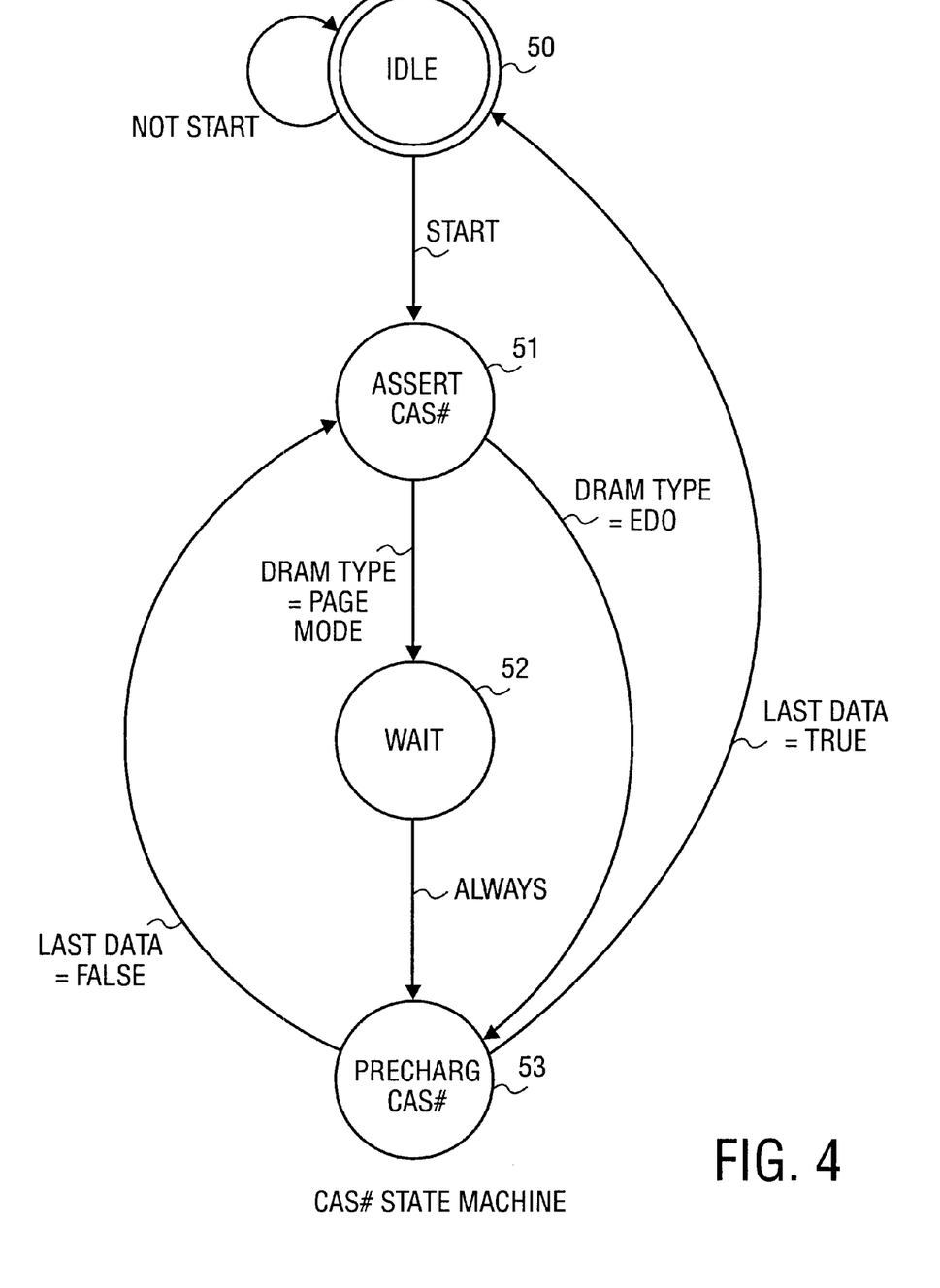
FIG. 4 is a timing diagram of the CAS state machine illustrating the various states of the CAS signal during an address request to the standard page mode DRAM and the EDO DRAM.

Referring now to FIG. 4, depicted is a block diagram illustrating one embodiment of the CAS# state machine 330 of the memory controller 105 of the preferred embodiment. The DRAM memory array of the preferred embodiment is organized as a number of banks. Each bank has up to one or more rows and a certain number of banks may be populated at any one time depending on how the memory array is configured.

Each row is also organized into a number of pages such that any time an access is made in the main memory 103, that location resides in a certain page of the rows. In the page mode operation as described earlier, significant performance can be gained if successive accesses to memory are written to the same page.

As illustrated in FIG. 4, the CAS state machine 330 controls the varying timing requirements of the DRAM devices so that memory access to the EDO DRAMs is not handled the same way as an access to the page mode DRAM. As illustrated, at state S0, the CAS# state machine 330 is idle when a cycle (write or read) is not being driven on the address bus by the processor 102. The CAS# signal is not asserted at this state. Once the CAS# signal is asserted by the memory controller 105 indicating a request to the main memory 103, the CAS# state machine 330 transitions to state S1 when data needs to be read from an EDO DRAM bank 230. After a requested address has been read from the requested EDO DRAM bank 230 location, the CAS# state machine 330 transitions to state S3 for a precharge of the CAS# inputs for each piece of data read after the first in a burst read, the CAS state machine 330 transitions back to state S0 after the last piece of data is read. If, on the other hand, there is more data to be read, the CAS# state machine 33 transitions back to state S1 for a reasserting of the CAS# signal to perform another access to the EDO DRAM bank locations after the precharging of the CAS# signal.

During a read cycle to the page mode DRAM devices, the processor 102 initiates an access request to the DRAM banks in the main memory 103 at state S0, upon receipt of the request, the memory controller 105 asserts the CAS# signal at state S1. After the access to the page mode DRAM banks is completed, the CAS# state machine 330 transitions into a wait state which lasts for one or more clocks at state S2. After the wait period is over, the CAS# state machine 330 transitions to state S3 for a precharge of the CAS# inputs. After a piece of data has been read, the CAS# state machine 330 transitions back to state S0, otherwise; the CAS# state machine 330 transitions to state S1 where the CAS# signal is reasserted by the memory controller 105 for another access of the main memory 103.

Figure 5:
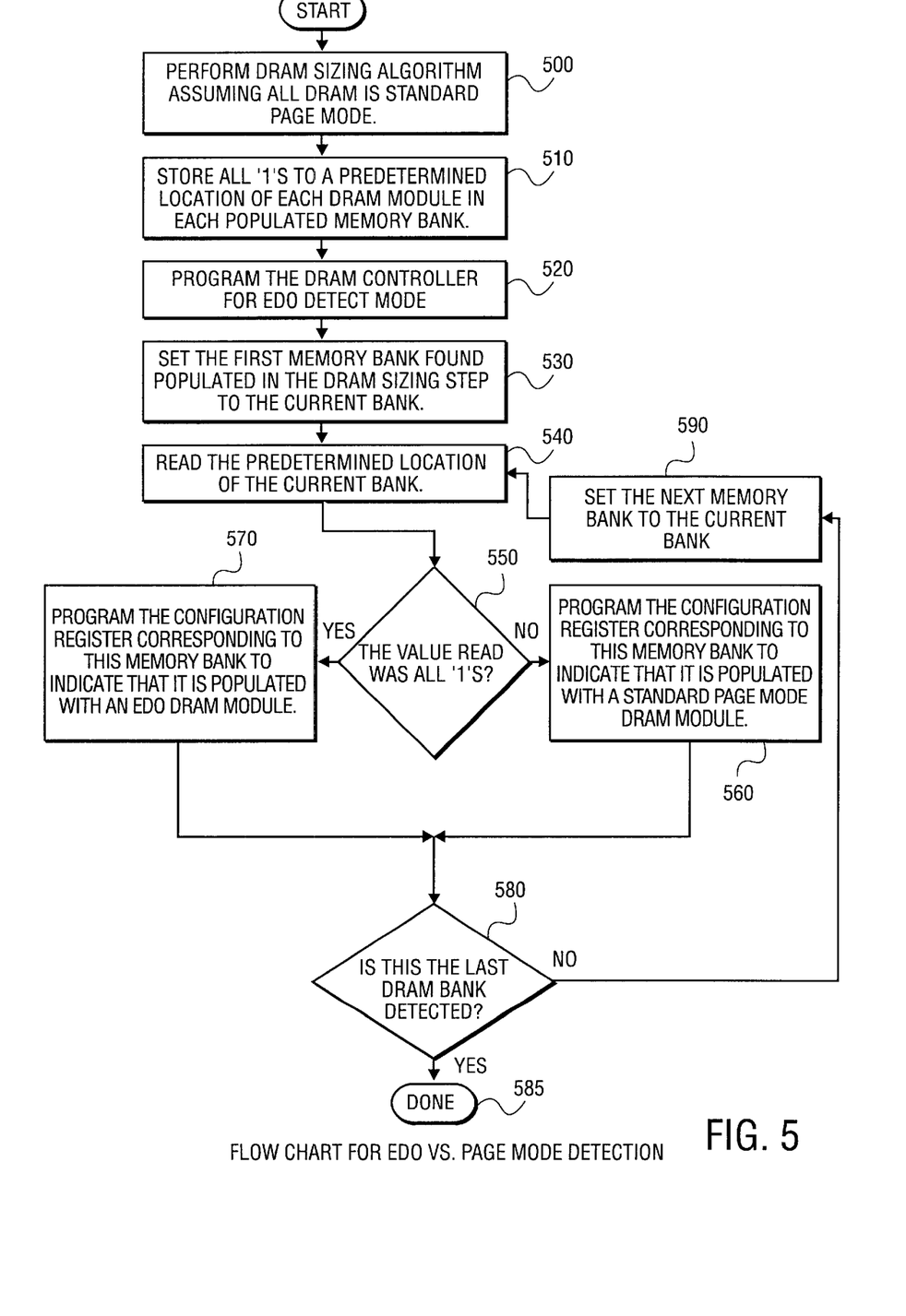
FIG. 5 is a flow chart illustrating the method of distinguishing populated memory banks populated with either the standard page mode DRAMs and the EDO DRAMs.

Reference is made to FIG. 5, which is a flow chart illustrating the detection logic of one embodiment of the preferred embodiment of the present invention for distinguishing between main memory banks populated with the page mode DRAMs and those populated with EDO DRAMs. As illustrated at box 500, the DRAM bank detection of the preferred embodiment begins with the system BIOS configuring the configuration registers in the memory controller with main memory bank information specifying which banks in main memory are populated with the DRAMs.

In box 510, after the sizing of the main memory banks, the detection logic causes a binary value of '1s' to be stored at a predetermined location in each memory bank found populated with the DRAMs. At this stage of the boot process, the memory controller 105 assumes the main memory banks 103 are populated with only standard page mode DRAMs.

At box 520, the detection logic programs the memory controller 105 for EDO detect mode enabling the memory controller 105 to distinguish between the memory banks containing EDO DRAMs and those containing standard page mode DRAMs. After programming the memory controller for EDO DRAM detection, processing continues at box 530.

At box 530, during a memory access to main memory 103, the memory controller 105 sets the first DRAM bank found at box 500 to be the current bank being accessed. The memory controller 105 reads the predetermined location of the current bank at step 540 and, at step 550 determines if the value read was all "1"s.

If the predetermined location contains "1s" based on the check at box 550, the memory controller 105 programs the configuration register corresponding to the current bank to indicate that the current bank is populated with an EDO DRAM; otherwise, the configuration register corresponding to the current bank is programmed to indicate that the current bank is populated with a standard page mode DRAM. After the memory controller 105 has been programmed to detect all the DRAM banks populated in main memory, processing continues at decision box 580.

At box 580, a determination is made whether the current DRAM bank is the last DRAM bank populated in the main memory 103. If the current bank is the last bank installed with the DRAM devices, the detection and configuration process ends at box 585; otherwise processing continues at box 590 where the next bank being checked is set to be the current bank.

Figure 6:
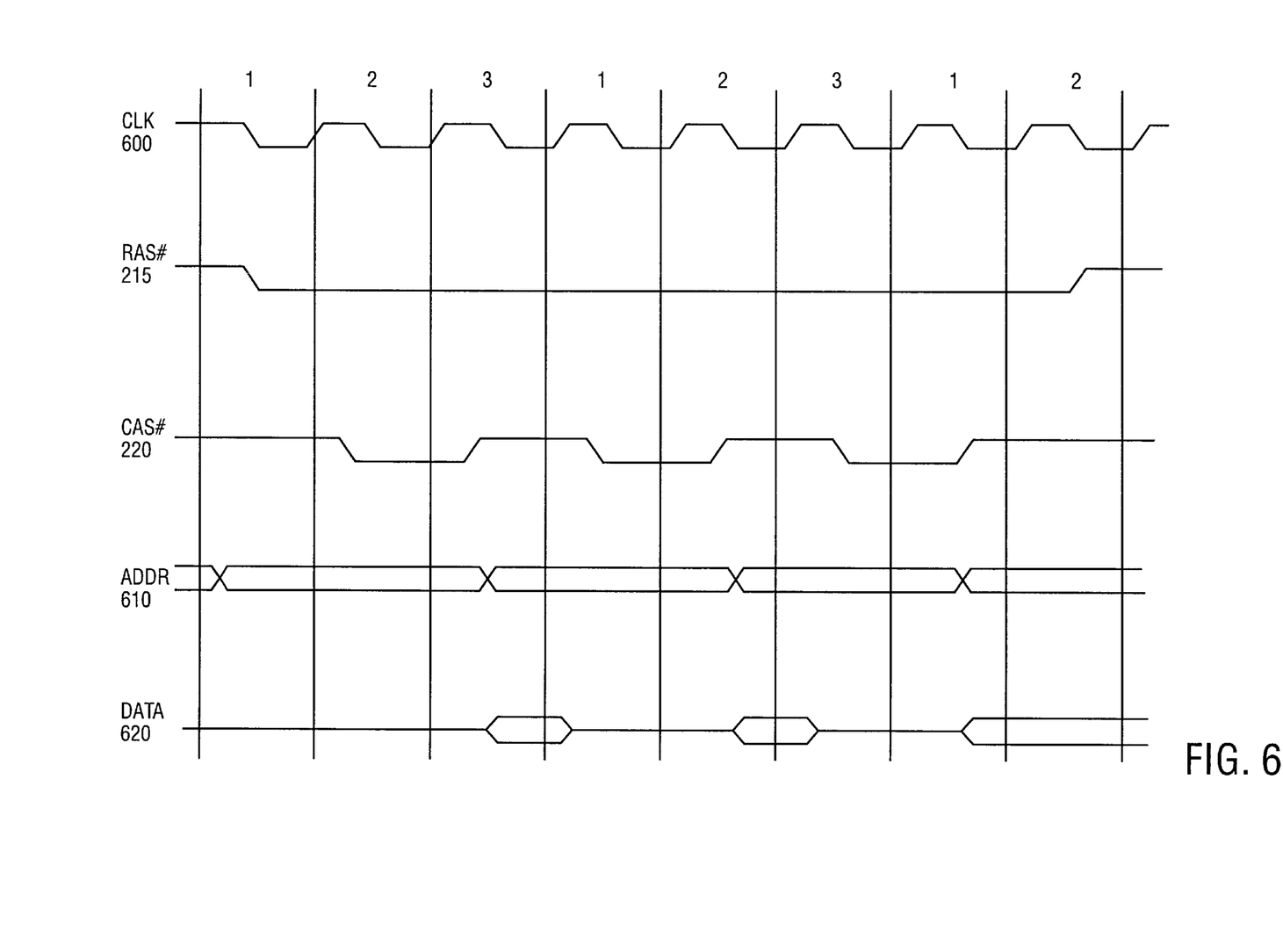
FIG. 6 is a waveform diagram of a read cycle of the EDO DRAM device.

Referring now to FIG. 6 depicted is a timing diagram illustrating a read cycle operation to the extended data-out DRAM device of the preferred embodiment. As illustrated in FIG. 6, a read operation to the EDO DRAM comprises three steps and begins at step 1 when the first column address 610 is driven by the memory controller 105 at the clock 1. The address has a minimum setup to the falling edge of the CAS# signal 220.

At step 2, the CAS# signal 220 is driven low by the memory controller 105 at the clock 2. At clock 2, the EDO DRAM has a minimum data access time from the falling edge of the CAS# signal 220.

At step 3, the CAS# signal 220 is driven high by the memory controller 105. The EDO DRAM unlike the standard page mode DRAMs continues to drive data even though the CAS# signal 220 is driven high to make data 620 available at clock 3. Steps 1,2, and 3 are repeated for each piece of data read from the DRAM.

Figure 7:
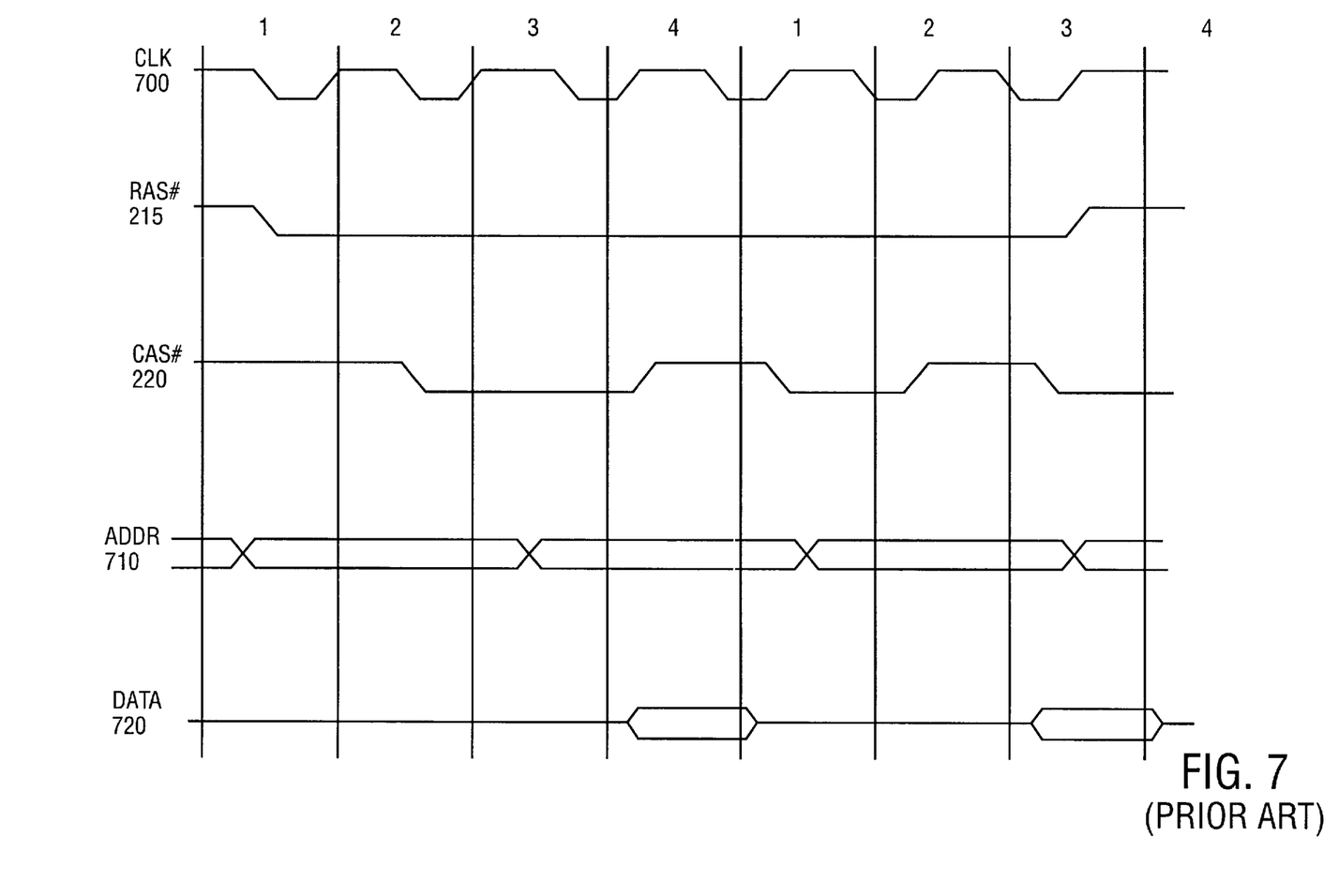
FIG. 7 is a waveform diagram of a read cycle of the standard page mode DRAM device of the prior art.

FIG. 7 is a timing diagram illustrating a read operation to a standard page mode DRAM of the prior art. As illustrated in FIG. 7, a read operation comprises four steps and begins at step 1 when the memory controller 105 drives the first column of an address 710 at clock 1.

At step 2, the CAS# signal 220 is driven low by the memory controller 105 at clock 2. The standard page mode DRAMs, like the EDO DRAMS, have a minimum data access time from the falling edge of the CAS# signal 220 until the rising edge.

At step 3, the CAS# signal 220 continues to remain low at clock 3. The standard page mode DRAMs samples data at clock 4. Sampling data at clock 4 requires the standard page mode DRAMs to tristate the data bus requiring the memory controller 105 to keep the CAS# signal 220 low for an additional clock.

At step 4, the memory controller 105 drives the CAS# signal 220 high at clock 4. The standard page mode DRAM has a minimum data access time from the falling and the rising edge of the CAS# signal 220. Steps 1 through 4 are repeated for each piece of data read out of the page mode DRAM.

As illustrated by the timing diagrams in FIGS. 6 and 7, a read cycle operation to the page mode requires an additional clock than a read cycle to the EDO DRAMs. The additional clock of CAS# assertion required to sample data in a page mode DRAM causes read operations to the page mode DRAMs to be slower than read cycles to the EDO DRAMs. However, by effectively integrating the EDO DRAMs and the page mode DRAMs the preferred embodiment reduces the performance degradation of the prior art system and makes such degradation less obvious to the user.

Thus, a method and apparatus for integrating and determining whether a memory subsystem is populated with a standard page mode DRAM device and an extended data-out DRAM device is described. From the above description, it will be apparent that the invention disclosed herein provides a novel and advantageous method and apparatus for distinguishing between the types of dynamic random access memory in a computer system. The foregoing discussion discloses and describes exemplary methods and embodiments of the present invention. As will be understood by those familiar with the art, the invention may be embodied in other specific forms without departing from its spirit or essential characteristics, and thus, the described embodiment is not restrictive of the scope of the invention. The following claims are indicative of the scope of the invention. All variations which come within the meaning and range of equivalency of the claims are to be embraced within their scope.

What is claimed is:

1. A method comprising:

writing a value to a memory location of a memory bank via a column control signal having a first timing characteristic corresponding to a first memory type;

reading the memory location using a column control signal with a second different timing characteristic corresponding to a second memory type;

assigning a selected one of the first and second memory types to the memory bank based on a result of the reading using the column control signal with the second timing characteristic.

2. The method of claim 1, wherein the second memory type has a shorter column control signal assertion requirement than the first memory type, and the assigning comprises assigning the memory bank the second memory type if the result of the reading is the same as the value used in the writing.

3. The method of claim 2, wherein the assigning comprises comparing the result of the reading to the value used in the writing.

4. The method of claim 2, wherein the first memory type is a page mode memory type, and the second memory type is an extended data out memory type.

5. A computer system comprising:

a memory subsystem having a plurality of memory banks, with each bank being populated with the memory modules selected from a group consisting of a first and a second memory type to be accessed with column control signals with a first and a second different timing characteristic respectively; and circuitry to automatically determine a type of a selected memory bank by writing a value to a memory location of a memory bank via a column control signal having the first timing characteristic, reading the memory location using a column control signal with the second different timing characteristic corresponding to the second memory type, and assigning a selected one of the first and second memory types to the memory bank based on the result of the reading using the column control signal with the second timing characteristic.

6. The computer system of claim 5, wherein the second memory type has a shorter column control signal assertion requirement than the first memory type, and the computer system further includes at least one register for the programming instructions to store at least one bit in the at least one register to denote the memory bank as being the second memory type if the result of the reading is the same as the value used in the writing.

7. The computer system of claim 6 wherein the computer system further includes detection circuitry to detect if the result of the reading is the same as the value used in the writing.

8. The computer system of claim 5, wherein the first memory type is a page mode memory type, and the second memory type is an extended data out memory type.

9. A memory controller comprising:
   a first circuit to automatically determine a type of a selected memory bank by writing a value to a memory location of a memory bank via a first column control signal having the first timing characteristic corresponding to a first memory type;
   a second circuit to read the memory location using a second column control signal with the second different timing characteristic corresponding to the second memory type; and
   a third circuit to assign a selected one of the first and second memory types to the memory bank based on the result of the reading using the second column control signal with the second timing characteristic.

10. The memory controller of claim 9, wherein the second memory type has a shorter column control signal assertion requirement than the first memory type, and the memory controller further includes at least one register for the programming instructions to store at least one bit in the at least one register to denote the memory bank as being the second memory type if the result of the reading is the same as the value used in the writing.

11. The memory controller of claim 10 wherein the memory controller further includes detection circuitry to detect if the result of the reading is the same as the value used in the writing.

12. The memory controller of claim 9, wherein the first memory type is a page mode memory type, and the second memory type is an extended data out memory type.

13. A method comprising:
   writing a value to a memory location of a memory bank via with a column control signal having a first timing characteristic corresponding to a page mode memory type;
   reading the memory location using a column control signal with a second different timing characteristic corresponding to a extended data out memory type;
   assigning a selected one of the page mode memory type and extended data out memory type to the memory bank based on a result of the reading using the column control signal with the second timing characteristic.

14. The method of claim 1, wherein the extended data out memory type has a shorter column control signal assertion requirement than the page mode memory type, and the assigning comprises assigning the memory bank the extended data out memory type if the result of the reading is the same as the value used in the writing.

15. The method of claim 2, wherein the assigning comprises comparing the result of the reading to the value used in the writing.

16. A computer system comprising:
   a memory subsystem having a plurality of memory banks, with each bank being populated with the memory modules selected from a group consisting of a page mode memory type and an extended data out memory type to be accessed with column control signals with a first and a second different timing characteristic respectively; and
   circuitry to automatically determine a type of a selected memory bank by writing a value to a memory location of a memory bank via a column control signal having the first timing characteristic corresponding to a page mode memory type, reading the memory location using a column control signal with the second different timing characteristic corresponding to the second memory type, and assigning a selected one of the page mode memory type and extended data out memory type to the memory bank based on the result of the reading using the column control signal with the second timing characteristic.

17. The computer system of claim 16, wherein the extended data out memory type has a shorter column control signal assertion requirement than the page mode memory type, and the computer system further includes at least one register for the programming instructions to store at least one bit in the at least one register to denote the memory bank as being the extended data out memory type if the result of the reading is the same as the value used in the writing.

18. The computer system of claim 17 wherein the computer system further includes detection circuitry to detect if the result of the reading is the same as the value used in the writing.

* * * * *